United States Patent
Shelestak et al.

(10) Patent No.: US 6,849,566 B2
(45) Date of Patent: Feb. 1, 2005

(54) BLUE-GREEN GRASS

(75) Inventors: Larry J. Shelestak, Bairdford, PA (US); Dennis G. Smith, Butler, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 10/199,774

(22) Filed: Jul. 19, 2002

(65) Prior Publication Data

US 2004/0014587 A1 Jan. 22, 2004

(51) Int. Cl.$^7$ ............................................. C03C 3/087
(52) U.S. Cl. ........................................... 501/71; 501/70
(58) Field of Search ...................................... 501/70, 71

(56) References Cited

U.S. PATENT DOCUMENTS

| | | | |
|---|---|---|---|
| 2,755,212 A | | 7/1956 | Brown ........................ 154/2.77 |
| 2,956,892 A | | 10/1960 | Duncan ........................ 106/52 |
| 4,525,462 A | | 6/1985 | Behr ............................. 501/71 |
| 4,792,536 A | | 12/1988 | Pecoraro et al. ............... 501/70 |
| 5,214,008 A | | 5/1993 | Beckwith et al. .............. 501/69 |
| 5,385,872 A | * | 1/1995 | Gulotta et al. ................. 501/71 |
| 5,523,263 A | * | 6/1996 | Penrod .......................... 501/27 |
| 5,641,716 A | * | 6/1997 | Higby et al. ................... 501/27 |
| 5,688,727 A | * | 11/1997 | Shelestak et al. .............. 501/71 |
| 5,776,845 A | | 7/1998 | Boulos et al. ................. 501/70 |
| 5,792,559 A | | 8/1998 | Heithoff et al. .............. 428/437 |
| 5,817,587 A | | 10/1998 | Jeanvoine et al. ............. 501/70 |
| 5,830,812 A | | 11/1998 | Shelestak et al. .............. 501/71 |
| 5,858,894 A | * | 1/1999 | Nagashima et al. ........... 501/64 |
| 5,858,896 A | * | 1/1999 | Nagashima et al. ........... 501/66 |
| 6,017,837 A | * | 1/2000 | Nagashima et al. ........... 501/64 |
| 6,030,911 A | * | 2/2000 | Scheffler-Hudlet et al. .... 501/71 |
| 6,046,122 A | * | 4/2000 | Nagashima et al. ........... 501/64 |
| 6,114,264 A | * | 9/2000 | Krumwiede et al. ........... 501/70 |
| 6,506,700 B1 | * | 1/2003 | Combes et al. ................ 501/70 |
| 6,589,897 B1 | * | 7/2003 | Foguenne ..................... 501/71 |
| 6,596,660 B1 | * | 7/2003 | Boulos et al. ................. 501/70 |
| 6,624,102 B2 | * | 9/2003 | Seto et al. ..................... 501/71 |
| 2001/0025004 A1 | | 9/2001 | Seto et al. |

FOREIGN PATENT DOCUMENTS

| | | | |
|---|---|---|---|
| EP | 0 297 404 | | 1/1989 |
| EP | 0 864 545 | | 9/1998 |
| EP | 0 952 123 | | 10/1999 |
| EP | 1 002 773 | | 5/2000 |
| EP | 1 031 543 | | 8/2000 |
| EP | 1 888 725 | | 3/2002 |
| EP | 0 965 570 | | 9/2002 |
| EP | 1 270 524 | | 1/2003 |
| GB | 2 381 269 | | 4/2003 |
| WO | WO 96/28394 A | * | 9/1996 |
| WO | WO 00/01633 A1 | * | 1/2000 |
| WO | 00/01633 | | 1/2000 |
| WO | 01/49622 | | 7/2001 |

OTHER PUBLICATIONS

International Search Report Dated Nov. 20, 2003.

* cited by examiner

*Primary Examiner*—Karl Group
*Assistant Examiner*—Elizabeth A. Bolden
(74) *Attorney, Agent, or Firm*—Jacques B. Miles

(57) ABSTRACT

A blue-green colored glass composition includes a base portion, such as a conventional soda-lime-silica base, and major colorants. In one embodiment, the major colorants include 0.7 to 0.9 weight percent total iron ($Fe_2O_3$), 0.2 to 0.3 weight percent FeO, and 0 to 5 ppm CoO. The glass is characterized by a dominant wavelength in the range of 490 nm to 495 nm and an excitation purity in the range of 3% to 11%. The glass of the invention can be essentially free of Se.

28 Claims, No Drawings

BLUE-GREEN GRASS

BACKGROUND OF THE INVENTION

1. Field of the Invention

This invention relates generally to tinted or colored glass and, more particularly, to a blue-green colored soda-lime-silica glass having desirability for both architectural and vehicle glass applications.

2. Technical Considerations

It is known to provide glass compositions of various colors. For example, U.S. Pat. No. 5,214,008; U.S. Pat. No. 5,830,812; U.S. 2001/0025004; EP 0952123; and EP 0965570 disclose green or gray-green colored glass. EP 1031543A1; U.S. Pat. No. 2,956,892; U.S. Pat. No. 5,688,727; and U.S. Pat. No. 4,525,462 disclose blue colored glass. U.S. Pat. No. 2,755,212; U.S. Pat. No. 5,817,587; and WO 01/49622 disclose blue-green colored glass. These known glass compositions are useful for architectural glass, such as windows, insulated glass units, and the like, as well as for vehicle glass, such as automotive transparencies, e.g., windshields, side lights, back lights, moon roofs, sun roofs, privacy glass, and the like.

In order to achieve a desired color for a particular use, these known glass compositions contain various colorant materials. The primary colorant in typical blue or green colored glass compositions is iron, which is usually present in both the ferric ($Fe_2O_3$) and ferrous (FeO) forms. Other common colorants include cobalt, selenium, nickel, chromium, manganese, and titanium.

In producing conventional colored glass, such as conventional blue, green, or blue-green glass, the relative amounts of iron and the other colorants must be closely monitored and controlled within a specific operating range to provide the glass with the desired final color and spectral properties for a particular use. Varying the colorants outside this operating range can detrimentally affect the final color of the glass, the light transmittance characteristics of the glass, and the melting qualities of the glass composition. For example, increasing the amount of iron present in a particular glass composition can increase the difficulty of melting the glass batch materials, particularly in a continuous glass melting furnace, and can also decrease the visible light transmittance of the glass. Additionally, some of these known colored glass compositions contain selenium as one of the major colorants. However, a problem with selenium is that it is highly volatile at the temperatures used for conventional glass manufacture. The selenium can rapidly volatize before it can be incorporated into the glass and can thus affect the final glass color. Selenium volatilization can also lead to other production problems, such as unacceptable furnace emissions, color streaks, and poor color control.

It would be advantageous to provide a blue-green colored glass having desirable aesthetic and transmittance characteristics suitable for use with architectural glass and/or vehicle glass but which overcomes at least some of the drawbacks of known colored glass compositions.

SUMMARY OF THE INVENTION

The present invention provides a blue-green colored glass composition that can be essentially free of selenium but still have an aesthetically pleasing blue-green color and luminous (visible light) transmittance within a range that allows the glass to be used in both architectural and vehicle transparencies. Being essentially free of selenium reduces the volatilization, streaking, and emission problems encountered with previous colored glass compositions. Additionally, the amount of iron in the present glass is lower than many prior blue or green glass compositions such that the glass of the present invention provides improved melting characteristics compared to these known glass compositions. In one embodiment, the glass of the present invention can have a typical soda-lime-silica glass base portion, such as that for conventional float or flat glass, with major colorants that provide the aesthetically pleasing blue-green color. In one embodiment, the major colorants comprise 0.7 to 0.9 weight percent total iron (expressed as $Fe_2O_3$ as described below), 0 to 5 ppm CoO, and 0.2 to 0.3 weight percent FeO. The major colorants provide the glass with a dominant wavelength in the range of 490 nanometers (nm) to 495 nm and an excitation purity in the range of 3% to 11% at a thickness in the range of 0.079 inch (2 mm) to 0.223 inch (5.67 mm). The major colorants also provide some solar control properties. The composition can be essentially free of Se.

In another embodiment, the major colorants comprise 0.7 to 0.85 weight percent total iron ($Fe_2O_3$), 0 to 5 ppm CoO, and 0.2 to 0.3 weight percent FeO. The major colorants provide the glass with a dominant wavelength in the range of 490 nm to 493 nm and an excitation purity in the range of 7% to 10% at a thickness in the range of 0.118 inch (3 mm) to 0.223 inch (5.67 mm).

In an additional embodiment, the major colorants comprise 0.7 to 0.9 weight percent total iron ($Fe_2O_3$), 0 to 5 ppm CoO, 0 to 200 parts per million (ppm) $Cr_2O_3$, 0 to 1 weight percent $TiO_2$, and 0.2 to 0.3 weight percent FeO. The major colorants provide the glass with a dominant wavelength in the range of 490 nm to 495 nm, an excitation purity in the range of 7% to 10% at a thickness in the range of 0.118 inch (3 mm) to 0.223 inch (5.67 mm), and an ISOUV value of greater than or equal to 25 percent at a thickness of 0.129 inch (3.3 mm).

DESCRIPTION OF THE PREFERRED EMBODIMENTS

Unless otherwise indicated, all numbers expressing dimensions, physical characteristics, quantities of ingredients, reaction conditions and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, any reference indicated to as being "incorporated herein" is to be understood as being incorporated in its entirety. Any reference to amounts, unless otherwise specified, is "by weight percent" based on the total weight of the final glass composition. The "total iron" content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. The term "total iron" means total iron expressed in terms of $Fe_2O_3$ and the term "FeO" means iron in the ferrous state expressed in terms of FeO. The term "redox ratio" means the amount of iron in the ferrous state (expressed as FeO) divided by the amount of total iron (expressed as $Fe_2O_3$). As used herein, selenium is expressed in terms of elemental Se and cobalt is expressed in terms of CoO. Chromium and titanium are expressed as $Cr_2O_3$ and $TiO_2$, respectively. As used herein, the terms "solar control" and "solar control properties" mean characteristics or properties that affect the solar performance properties of the glass, such as visible, infrared (IR) and/or ultraviolet (UV) transmittance and/or reflectance of the glass. In describing the glass of the invention, the terms "blue-green glass" or "blue-green colored" refer to glass having a dominant wavelength in the range of 490 nanometers (nm) to 495 nm at a thickness in the range of 2 mm to 6 mm and may also be characterized as blue, green, or greenish-blue.

The present invention provides an aesthetically desirable blue-green colored glass composition with aesthetic and transmittance characteristics that make the glass particularly desirable for both architectural and vehicle applications. Unlike many colored glass compositions of the prior art, the present glass can be essentially free of Se. By "essentially free of Se" is meant that no intentional addition of Se is made to the glass composition. However, trace amounts of Se can be present due to contamination or other sources, such as cullet. By "trace amounts of Se" is meant in the range of 0 ppm to 3 ppm Se, such as less than or equal to 3 ppm Se, such as less than or equal to 2 ppm, such as less than or equal to 1 ppm, such as less than or equal to 0.5 ppm, such as less than or equal to 0.1 ppm, such as less than or equal to 0.01 ppm. Alternatively, in one embodiment, a small amount, e.g., less than or equal to 4 ppm, such as less than or equal to 3 ppm Se, such as in the range of 0 ppm to 3 ppm can be added. Moreover, the total iron present in the glass composition provides the glass with desirable melting characteristics, particularly for use in a conventional continuous glass-melting furnace.

Generally, the blue-green colored glass compositions of the present invention have a base portion and major colorants. By "base portion" is meant the major constituents of the glass without the major colorants. By "major colorants" is meant materials intentionally added to provide the glass with a color in a desired dominant wavelength range. Although the invention can be practiced with any type of conventional glass, the general principles of the invention will be described with respect to a conventional soda-lime-silica glass composition. An exemplary soda-lime-silica type glass composition incorporating features of the invention has a base portion characterized as follows (all values are in weight percent based on the total weight of the glass composition):

$SiO_2$ 65 to 75
$Na_2O$ 10 to 20
CaO 5 to 15
MgO 0 to 5
$Al_2O_3$ 0 to 5
$K_2O$ 0 to 5

As will be appreciated by one skilled in the art, $SiO_2$ is the principle component for glass. $Na_2O$ and $K_2O$ impact the melting characteristics of the glass. MgO and CaO impact glass durability and affect the divitrification temperature and viscosity of the glass during forming. $Al_2O_3$ also influences glass durability.

In the practice of the invention, major colorants comprising one or more of iron, cobalt, chromium, and/or titanium can be added to or present in this base portion at particular levels as defined below to provide the glass with the desired blue-green color. The particular aesthetically pleasing blue-green color of the glass lends the glass to use in both architectural and vehicle applications. In one further embodiment, Se can be added or present in the glass.

As will be appreciated by one skilled in the art, the color of an object, and in particular glass, can be highly subjective. Observed color can depend on the lighting conditions and the preferences of the observer. In order to evaluate color on a quantitative basis, several color systems have been developed. One such system of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2, herein incorporated by reference. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as L★, a★ and b★, are calculated from the tristimulus values (X, Y, Z). L★ indicates the lightness or darkness of the color and represents the lightness plane on which the color resides. a★ indicates the position of the color on a red (+a★) green (−a★) axis. b★ indicates the color position on a yellow (+b★) blue (−b★) axis. When the rectangular coordinates of the CIELAB system are converted into cylindrical polar coordinates, the resulting color system is known as the CIELCH color system which specifies color in terms of lightness (L★), and hue angle (H°) and chroma (C★). L★ indicates the lightness or darkness of the color as in the CIELAB system. Chroma, or saturation or intensity, distinguishes color intensity or clarity (i.e. vividness vs. dullness) and is the vector distance from the center of the color space to the measured color. The lower the chroma of the color, i.e. the less its intensity, the closer the color is to being a so-called neutral color. With respect to the CIELAB system, C★=(a★2+b★2)½. Hue angle distinguishes colors such as red, yellow, green and blue and is a measure of the angle of the vector extending from the a★, b★ coordinates through the center of the CIELCH color space measured counter-clockwise from the red (+a★) axis.

It should be appreciated that color may be characterized in any of these color systems and one skilled in the art may calculate equivalent DW and Pe values; L★, a★, b★ values; and L★, C★, H° values from the transmittance curves of the viewed glass or composite transparency. A detailed discussion of color calculations is given in U.S. Pat. No. 5,792,559, herein incorporated by reference.

With respect to the values reported herein, luminous transmittance (Lta) was measured using C.I.E. standard illuminant "A" with a 2° observer over the wavelength range of 380 to 770 nanometers. Glass color, in terms of dominant wavelength and excitation purity, was measured using C.I.E. standard illuminant "C" with a 2° observer, following the procedures established in ASTM E308-90. The total solar energy transmittance (TSET) was measured over the wavelength range of 300 to 2000 nanometers and the transmittance data were calculated using a Parry Moon air mass 2.0 direct solar irradiance data and integrated using the trapezoidal rule, as is known in the art. The ultraviolet transmittance (ISOUV) was based on ISO 9050:1990(E) standards, Section 2.5 (ISOUV) and was measured over a wavelength range of 280 nm to 380 nm.

In one embodiment of the invention, the major colorants provide the glass with a dominant wavelength in the range of 490 nm to 495 nm, such as 490 nm to 493 nm, at a thickness in the range of 0.079 inch (2 mm) to 0.223 inch (5.67 mm). The glass can have an excitation purity in the range of 3% to 11%, such as 7% to 10%, such as 7.5% to 10%. The major colorants can also provide the glass with solar control properties, such as IR and/or UV radiation absorbing characteristics.

In one embodiment, the major colorants comprise iron and cobalt. In this embodiment, the total iron ($Fe_2O_3$) can be present in an amount of 0.7 wt. % to 0.9 wt. %, such as 0.7 wt. % to 0.85 wt. %, such as 0.73 wt. % to 0.81 wt. %. Ferrous iron can be present in an amount of 0.15 wt. % to 0.35 wt. %, such as 0.2 wt. % to 0.3 wt. %, such as 0.21 wt. % to 0.3 wt. %, such as 0.21 wt. % to 0.29 wt. %, such as 0.23 wt. % to 0.28 wt. %. The iron, typically in the form of iron oxides, provides the glass with one or more functions. For example, ferric oxide is a strong ultraviolet radiation absorber and operates as a yellow colorant in the glass. Ferrous oxide is a strong infrared radiation absorber and operates as a blue colorant. The amount of ferrous oxide and ferric oxide (with or without the presence of other major colorants) can be adjusted to provide the glass with a desired dominant wavelength in the range of 490 nm to 495 nm, such as 490 nm to 493 nm, at a thickness in the range of 0.079 inch (2 mm) to 0.223 inch (5.67 mm).

Cobalt oxide (CoO) operates as a blue colorant and does not exhibit any appreciable infrared or ultraviolet radiation absorbing properties. A proper balance between the iron, i.e. ferric and ferrous oxides, or iron and any other colorants (if present), is important to obtain the desired blue-green colored glass.

In another embodiment of the invention, the major colorants can comprise 0.7 wt. % to 0.9 wt. % total iron ($Fe_2O_3$), 0.2 wt. % to 0.3 wt. % FeO, 0 ppm to 5 ppm CoO, 0 ppm to 200 ppm $Cr_2O_3$, and 0 wt. % to 2 wt. % $TiO_2$. In one embodiment, the total iron can range from 0.7 wt. % to 0.85 wt. %, such as 0.73 wt. % to 0.81 wt. %. In one embodiment, the FeO can range from 0.21 wt. % to 0.29 wt. %, such as 0.23 wt. % to 0.28 wt. %. In one embodiment, the CoO can be less than or equal to 4 ppm, such as in the range of 1–4 ppm, such as less than or equal to 3 ppm, such as less than or equal to 2 ppm, such as less than or equal to 1 ppm, such as less than or equal to 0.5 ppm, such as less than or equal to 0.2 ppm, such as less than or equal to 0.05 ppm, such as in the range of 0 ppm to 1 ppm. In a further embodiment, the $Cr_2O_3$ can be in the range of 20 ppm to 200 ppm, such as 20 ppm to 100 ppm, such as 20 ppm to 50 ppm. In another embodiment, the $Cr_2O_3$ can be in the range of 0 ppm to 20 ppm, such as 2 ppm to 15 ppm, such as 3 ppm to 10 ppm, such as 4 ppm to 8 ppm. In a still further embodiment, the $TiO_2$ can be in the range of 0.1 to 1.5 weight percent, such as 0.2 to 1 weight percent.

The particular combination of colorants can provide the blue-green glass of the invention with desirable spectral (e.g., solar control) properties as well as the aesthetically pleasing blue-green color. For use with architectural transparencies and non-vision vehicle transparencies (so called "privacy glass"), in one embodiment the glass of the invention can have a visible light transmittance (Lta) of less than or equal to 70% at a thickness of 0.079 inch (2 mm) to 0.223 inch (5.67 mm), such as in the range of 64% to 70%, such as 64% to 69%, such as 64% to 68%. In another embodiment, at a thickness in the range of 0.079 inch (2 mm) to 0.223 inch (5.67 mm), the glass can have an Lta of less than or equal to 60%, such as less than or equal to 50%, such as less than or equal to 45%, such as less than or equal to 40%. In a further embodiment, the glass can have an Lta in the range of 35% to 45% at a thickness of 0.079 inch (2 mm) to 0.223 inch (5.67 mm). For automotive vision glass or other higher transmittance applications, the glass can have an Lta of greater than or equal to 70% at a thickness of 0.079 inch (2 mm) to 0.223 inch (5.67 mm).

Additionally, the glass of the invention can have a total solar energy transmittance (TSET) in the range of 30% to 50% at a thickness of 0.079 inch (2 mm) to 0.223 inch (5.67 mm). In one embodiment the glass can have a TSET in the range of 40% to 55% at a thickness of 0.079 inch (2 mm) to 0.223 inch (5.67 mm), such as in the range of 45% to 50%, such as in the range of 48% to 49%. In another embodiment, the TSET can be in the range of 30% to 40% at a thickness of 0.079 inch (2 mm) to 0.223 inch (5.67 mm), such as in the range of 31% to 35% or in the range of 33% to 37%.

The glass of the invention can have an ISOUV value attractive for architectural applications. In one embodiment, the glass can have an ISOUV value of greater than 25% at a thickness of 0.129 inch (3.3 mm), such as greater than or equal to 27%, such as greater than or equal to 30%, such as in the range of greater than 25% to 31% at a thickness of (0.129 inch (3.3 mm). In another embodiment, the glass can have an ISOUV value in the range of 15% to 25% at a thickness of 0.223 inch (5.67 mm), such as in the range of 17% to 21%.

In one embodiment, the glass can have a shading coefficient in the range of 0.3 to 0.8, such as 0.5 to 0.7, such as 0.5 to 0.6 at a thickness in the range of 0.079 inch (2 mm) to 0.223 inch (5.67 mm).

In one embodiment, the glass can have a redox ratio in the range of 0.2 to 0.4, such as in the range of 0.25 to 0.35, such as in the range of 0.29 to 0.37.

To avoid the formation of nickel sulfide stones, one embodiment of the glass composition of the invention can be essentially nickel free; that is, no deliberate addition of nickel or nickel compounds is made to the glass, although the possibility of traces of nickel due to contamination may not always be avoided. Other embodiments of the invention could include nickel.

It should be appreciated that the glass compositions disclosed herein can include small amounts of other materials, for example, melting and refining aids, tramp materials, trace materials, impurities, and similar materials not intentionally added to change or affect the color of the glass. It should be further appreciated that small amounts of additional components can be included in the glass to provide desired color characteristics and/or improve the solar performance of the glass. Such materials, if present, should preferably not change the dominant wavelength of the glass to be more than about 2 nm outside the desired dominant wavelength range to achieve the blue-green glass of the invention as described herein.

The glass of the present invention can be made of any thickness. The glass can generally be thicker for typical architectural applications than for typical vehicle applications. In one embodiment, the glass can have a thickness in the range of 0.039 inch (1 mm) to 0.787 inch (20 mm), such as about 0.039 inch (1 mm) to 0.394 inch (10 mm), such as 0.079 inch (2 mm) to 0.223 inch (5.67 mm), such as 0.118 inch (3 mm) to 0.2 inch (5 mm).

The glass compositions of the present invention can be produced from melting and refining batch material known to those skilled in the art in a continuous, large-scale, commercial glass melting operation. The melting operation can be, for example, a conventional overhead fired continuous melting operation or a multi-stage melting operation, just to name a few. The glass compositions can be formed into flat glass sheets of varying thickness by the float process in which the molten glass is supported on a pool of molten metal, usually tin, as it assumes a ribbon shape and is cooled, in a manner well known in the art.

Depending on the type of melting operation, sulfur may be added to the batch materials of the soda-lime-silica glass as a melting and refining aid. In one embodiment, the glass of the invention can include less than or equal to about 0.5 wt. % $SO_3$, such as less than or equal to 0.3 wt. %, such as less than or equal to 0.2 wt. %, such as less than or equal to 0.18 wt. %, such as in the range of greater than 0 wt. % to 0.18 wt %. In a glass composition that includes iron and sulfur, providing reducing conditions may create amber coloration which lowers luminous transmittance as discussed in U.S. Pat. No. 4,792,536 to Pecoraro, et al. Increasing the FeO content can enable the absorption of the glass in the infrared region of the electromagnetic spectrum to be increased and the TSET to be reduced.

It should be appreciated that as a result of forming the glass on molten tin in a float process as discussed above, measurable amounts of tin oxide may migrate into surface portions of the glass on the side contacting the molten tin, e.g., become embedded in the glass. Typically, a piece of float glass has an $SnO_2$ concentration ranging from about 0.05 to 2 wt. % in about the first 25 microns below the surface of the glass that was in contact with the tin. Typical background levels of $SnO_2$ can be as high as 30 parts per million (ppm). It is believed that high tin concentrations in about the first 10 Angstroms of the glass surface supported by the molten tin can slightly increase the reflectivity of that glass surface; however, the overall impact on the glass properties is minimal.

Illustrating the invention are the following Examples, which are not to be considered as limiting the invention to their details.

EXAMPLES

The following examples illustrate glass compositions that embody principles of the present invention. The information in this section is based on laboratory melts. The optical and spectral properties disclosed in the following Tables are based on a reference thickness of 0.223 inch (5.67 mm), unless otherwise stated.

The following is representative of the base portion of the laboratory melts used in the following examples (all numbers are in grams):

| | |
|---|---|
| Sand | 2029.73 |
| Soda Ash | 663.72 |
| Dolomite | 361.29 |
| Limestone | 304.46 |

| | |
|---|---|
| Salt Cake | 14.208 |
| Rouge | as required |
| Coal | as required |

Coal was added to each melt as needed to control redox. As will be appreciated by one skilled in the art, for larger or smaller size melts, the total amounts of these components could be changed but their relative proportions (e.g., relative weight percents) would be about the same. Major colorants (as described in more detail below) were added to or were present in the base portion to affect the color and/or the solar performance properties of the glass.

Table 1 shows the batch materials for two exemplary glass samples (Samples 31 and 32). All values are in units of grams. The laboratory melts were prepared using the following general procedure. The glass batch materials were weighed out and mixed. All or a portion of the batch materials were placed in a crucible, such as a 6 inch (15 cm) diameter platinum crucible, and the crucible was placed in an electric oven at 2450° F. (1342° C.). After heating for 30 minutes, the oven temperature was increased to 2500° F. (1370° C.). After another 30 minutes, the oven temperature was increased to 2550° F. (1397° C.) and, optionally, additional batch material was added to fill the crucible. After heating for another 30 minutes at 2550° F. (1397° C.), the oven temperature was increased to 2650° F. (1453° C.) and held at this temperature for 30 minutes. After which, the melts were removed from the oven, fritted, dried, and returned to the electric furnace at a temperature of 2650° F. (1453° C.) and heated at this temperature for 1 hour. After which, the melts were removed from the oven, fritted for a second time, and then returned to the oven at a temperature of 2650° F. (1453° C.) and heated at this temperature for 2 hours. After which, the melts were removed from the oven, poured, and annealed at a temperature of 1125° F. (606° C.) for about one hour. The resultant glass was polished on both sides to a final thickness, e.g., 0.223 inch (6 mm). The chemical analysis of the glass compositions was determined using a RIGAKU 3370 X-ray fluorescence spectrophotometer. The spectral characteristics of the glass were determined using a Perkin-Elmer Lambda 9 UV/VIS/NIR spectrophotometer.

Table 2 shows the composition of the major colorant portion for a first set of samples (Samples 1–4) of glass formed in accordance with the invention. The redox ratios were estimated in conventional manner from the spectral data of the glass. For example, the spectral FeO was defined as equal to $\log(R_f/(T_{1000})/\alpha \cdot d$, where $R_f$ equals the reflection factor (defined as 100 minus the percent surface reflectance), $T_{1000}$ equals the transmittance at 1000 nm, $\alpha$ equals the luminous absorption coefficient (which for FeO at 1000 nm is 21.5), and d equals the thickness of the glass in inches. The total iron (as $Fe_2O_3$) was determined by x-ray fluorescence. The redox ratio was then calculated as the spectral FeO divided by the total iron (as $Fe_2O_3$).

Table 3 shows the solar performance data for the glass compositions of Table 2. The ISOUV value was calculated for a glass thickness of 0.129 inch (3 mm). The other data are based on a thickness of 0.223 inch (6 mm). The optical characteristics and values listed in Table 3, with the exception of Lta and TSET, were determined using the WINDOWS (Version 4.0–4.1) software commercially available from the Lawrence Berkeley National Laboratory. Tvis indicates the WINDOWS determined total visible light transmittance, Tuv indicates the WINDOWS determined ultraviolet light transmittance, and Tir indicates the WINDOWS determined infrared light transmittance.

The glass compositions in Samples 1–4 all contain about 2.5 ppm Se and are relatively high in total iron. Additionally, there was no intentional addition of $Cr_2O_3$ or $TiO_2$. The $Cr_2O_3$ and $TiO_2$ present in the glass are believed to come from tramp materials and were not intentionally added to the glass composition. Primarily because of the high iron content, the glass formed from these compositions has a Tvis of less than 40% and an Lta of less than 38%. The blue-green color of the glass along with these solar performance characteristics make the glass particularly useful for architectural applications, such as for architectural windows for buildings along or adjacent to a coastline.

Table 4 shows the compositions of the major colorant portions for additional glass compositions (Samples 5–32) made in accordance with the invention. The notation "NIA" means "no intentional addition" of the component was made. The solar performance data for Samples 5–32 is shown in Table 5.

In Samples 5–32, no intentional addition of Se was made and the total iron is relatively less than that for Samples 1–4 above. Thus, Samples 5–32 have Tvis values generally greater than 60% and Lta values greater than about 58%. Again, the $Cr_2O_3$ and $TiO_2$ are believed to come from tramp materials and were not intentionally added to the glass composition. As illustrated in Tables 4 and 5, samples with higher redox ratios tend to have lower dominant wavelengths and samples with lower redox ratios tend to have higher dominant wavelengths. For example, Sample 8 (redox ratio 0.503) has a dominant wavelength of 488.64 nm while Sample 25 (redox ratio 0.278) has a dominant wavelength of 495.0 nm. Additionally, Sample 32 was observed to have a particularly pleasing blue-green color.

TABLE 1

| Sample | Sand | Soda Ash | Dolomite | Limestone | Salt Cake | Coal | Rouge | Total Weight |
|---|---|---|---|---|---|---|---|---|
| 31 | 2029.73 | 663.72 | 361.29 | 304.46 | 14.208 | 1.52 | 21.900 | 3396.84 |
| 32 | 2029.73 | 663.72 | 361.29 | 304.46 | 14.208 | 1.73 | 21.900 | 3397.05 |

TABLE 2

| Sample | Total Fe (wt. %) | redox ratio | FeO (wt. %) | CoO (ppm) | Se (ppm) | Cr2O3 (ppm) | TiO2 (wt. %) | SO3 (wt. %) |
|---|---|---|---|---|---|---|---|---|
| 1 | 1.464 | 0.251 | 0.367 | 48 | 2.5 | 8 | 0.020 | 0.176 |
| 2 | 1.458 | 0.329 | 0.480 | 47 | 2.5 | 6 | 0.021 | 0.110 |
| 3 | 1.475 | 0.343 | 0.506 | 50 | 2.5 | 9 | 0.020 | 0.096 |
| 4 | 1.458 | 0.420 | 0.612 | 48 | 2.5 | 9 | 0.020 | 0.068 |

TABLE 3

| Sample | Lta | TSET | Tvis | Tuv | Tir | Shading Coefficient | ISOUV | Dominant Wavelength (nm) | Excitation Purity (%) | L* | a* | b* |
|---|---|---|---|---|---|---|---|---|---|---|---|---|
| 1 | 37.62 | 19.09 | 39.58 | 5.34 | 5.48 | 0.46 | 10.74 | 491.82 | 12.79 | 69.86 | −15.28 | −2.75 |
| 2 | 33.62 | 16.18 | 35.90 | 6.35 | 2.69 | 0.43 | 12.07 | 489.30 | 18.25 | 67.39 | −17.44 | −6.43 |
| 3 | 32.82 | 15.76 | 35.18 | 6.85 | 2.27 | 0.43 | 12.70 | 488.63 | 19.82 | 66.91 | −17.81 | −7.64 |
| 4 | 29.94 | 14.26 | 32.49 | 7.73 | 1.24 | 0.42 | 13.82 | 487.45 | 24.16 | 64.97 | −19.28 | −10.45 |

TABLE 4

| Sample | Total Fe (wt. %) | Redox | FeO (wt. %) | CoO (ppm) | Se (ppm) | Cr2O3 (ppm) | TiO2 (wt. %) | SO3 (wt. %) |
|---|---|---|---|---|---|---|---|---|
| 5 | 0.764 | 0.310 | 0.237 | NIA | NIA | 6 | 0.019 | 0.106 |
| 6 | 0.760 | 0.382 | 0.290 | NIA | NIA | 6 | 0.018 | 0.077 |
| 7 | 0.747 | 0.347 | 0.259 | NIA | NIA | 7 | 0.016 | 0.087 |
| 8 | 0.762 | 0.503 | 0.383 | NIA | NIA | 8 | 0.016 | 0.047 |
| 9 | 0.881 | 0.290 | 0.255 | NIA | NIA | 8 | 0.016 | 0.137 |
| 10 | 0.867 | 0.325 | 0.282 | NIA | NIA | 6 | 0.017 | 0.104 |
| 11 | 0.879 | 0.332 | 0.292 | NIA | NIA | 6 | 0.018 | 0.095 |
| 12 | 0.874 | 0.373 | 0.326 | NIA | NIA | 8 | 0.017 | 0.081 |
| 13 | 0.775 | 0.357 | 0.277 | NIA | NIA | 6 | 0.016 | 0.111 |
| 14 | 0.773 | 0.318 | 0.246 | NIA | NIA | 6 | 0.016 | 0.138 |
| 15 | 0.773 | 0.344 | 0.266 | NIA | NIA | 7 | 0.016 | 0.122 |
| 16 | 0.778 | 0.350 | 0.272 | NIA | NIA | 6 | 0.017 | 0.121 |
| 17 | 0.764 | 0.318 | 0.243 | 0 | NIA | 5 | 0.017 | 0.129 |
| 18 | 0.762 | 0.325 | 0.248 | 2 | NIA | 8 | 0.016 | 0.120 |

TABLE 4-continued

| Sample | Total Fe (wt. %) | Redox | FeO (wt. %) | CoO (ppm) | Se (ppm) | Cr2O3 (ppm) | TiO2 (wt. %) | SO3 (wt. %) |
|---|---|---|---|---|---|---|---|---|
| 19 | 0.764 | 0.315 | 0.241 | 4 | NIA | 7 | 0.017 | 0.130 |
| 20 | 0.765 | 0.301 | 0.230 | 5 | NIA | 7 | 0.017 | 0.147 |
| 21 | 0.768 | 0.321 | 0.247 | NIA | NIA | 6 | 0.016 | 0.144 |
| 22 | 0.762 | 0.281 | 0.214 | NIA | NIA | 6 | 0.015 | 0.183 |
| 23 | 0.765 | 0.288 | 0.220 | NIA | NIA | 5 | 0.014 | 0.179 |
| 24 | 0.762 | 0.294 | 0.224 | NIA | NIA | 4 | 0.015 | 0.171 |
| 25 | 0.767 | 0.278 | 0.213 | NIA | NIA | 6 | 0.015 | 0.179 |
| 26 | 0.761 | 0.315 | 0.240 | NIA | NIA | 5 | 0.015 | 0.152 |
| 27 | 0.744 | 0.322 | 0.240 | NIA | NIA | 5 | 0.016 | 0.176 |
| 28 | 0.746 | 0.322 | 0.240 | NIA | NIA | 6 | 0.014 | 0.147 |
| 29 | 0.748 | 0.329 | 0.246 | NIA | NIA | 5 | 0.016 | 0.138 |
| 30 | 0.773 | 0.356 | 0.275 | NIA | NIA | 6 | 0.016 | 0.125 |
| 31 | 0.772 | 0.297 | 0.229 | NIA | NIA | 5 | 0.015 | 0.202 |
| 32 | 0.772 | 0.336 | 0.259 | NIA | NIA | 4 | 0.016 | 0.158 |

TABLE 5

| Sample | Lta | TSET | Tvis | Tuv | Tir | Shading Coefficient | ISOUV | Dominant Wavelength (nm) | Excitation Purity (%) | L* | a* | b* |
|---|---|---|---|---|---|---|---|---|---|---|---|---|
| 5 | 66.45 | 36.47 | 68.60 | 25.50 | 13.51 | 0.59 | 30.46 | 492.20 | 7.89 | 86.81 | −11.40 | −1.87 |
| 6 | 63.21 | 32.91 | 65.77 | 27.04 | 9.17 | 0.56 | 31.82 | 490.31 | 10.72 | 85.55 | −13.15 | −4.00 |
| 7 | 65.06 | 34.83 | 67.38 | 25.88 | 11.47 | 0.58 | 30.78 | 491.40 | 9.00 | 86.27 | −12.15 | −2.67 |
| 8 | 58.37 | 28.81 | 61.52 | 30.02 | 4.88 | 0.53 | 34.38 | 488.64 | 15.17 | 83.57 | −15.91 | −7.17 |
| 9 | 63.33 | 33.75 | 65.47 | 19.57 | 11.86 | 0.57 | 25.33 | 494.08 | 7.54 | 85.21 | −12.36 | −0.64 |
| 10 | 61.93 | 32.16 | 64.26 | 20.67 | 9.75 | 0.56 | 26.35 | 492.66 | 8.91 | 84.67 | −13.11 | −1.74 |
| 11 | 61.33 | 31.58 | 63.70 | 20.79 | 9.11 | 0.55 | 26.44 | 492.37 | 9.32 | 84.40 | −13.38 | −2.03 |
| 12 | 59.40 | 29.83 | 61.99 | 21.68 | 7.16 | 0.54 | 27.26 | 491.22 | 10.98 | 83.59 | −14.31 | −3.30 |
| 13 | 63.75 | 33.73 | 66.13 | 24.08 | 10.76 | 0.57 | 29.17 | 491.45 | 9.38 | 85.65 | −12.65 | −2.74 |
| 14 | 65.67 | 35.94 | 67.80 | 22.82 | 13.64 | 0.59 | 28.04 | 492.96 | 7.63 | 86.40 | −11.65 | −1.35 |
| 15 | 64.44 | 34.50 | 66.73 | 23.27 | 11.78 | 0.58 | 28.29 | 492.01 | 8.71 | 85.92 | −12.31 | −2.18 |
| 16 | 63.93 | 33.95 | 66.26 | 23.45 | 11.09 | 0.57 | 28.47 | 491.72 | 9.06 | 85.70 | −12.49 | −2.46 |
| 17 | 66.22 | 36.15 | 68.36 | 24.41 | 13.16 | 0.60 | 29.42 | 492.54 | 7.75 | 86.69 | −11.50 | −1.64 |
| 18 | 65.21 | 35.48 | 67.41 | 24.56 | 12.52 | 0.59 | 29.59 | 491.76 | 8.41 | 86.25 | −11.68 | −2.27 |
| 19 | 65.08 | 35.87 | 67.25 | 24.43 | 13.16 | 0.59 | 29.44 | 491.52 | 8.38 | 86.16 | −11.41 | −2.41 |
| 20 | 65.05 | 36.41 | 67.15 | 23.78 | 14.15 | 0.60 | 28.89 | 491.61 | 8.10 | 86.09 | −11.10 | −2.27 |
| 21 | 65.87 | 35.70 | 68.02 | 23.65 | 12.58 | 0.59 | 28.68 | 492.65 | 7.75 | 86.51 | −11.57 | −1.57 |
| 22 | 68.18 | 38.58 | 70.06 | 23.11 | 16.17 | 0.62 | 28.20 | 494.55 | 6.06 | 87.43 | −10.44 | −0.30 |
| 23 | 67.74 | 38.08 | 69.69 | 23.32 | 15.76 | 0.61 | 28.42 | 494.05 | 6.45 | 87.27 | −10.72 | −0.58 |
| 24 | 67.48 | 37.75 | 69.45 | 23.27 | 15.27 | 0.61 | 28.31 | 493.81 | 6.61 | 87.16 | −10.80 | −0.73 |
| 25 | 68.05 | 38.66 | 69.92 | 22.32 | 16.68 | 0.62 | 27.45 | 495.00 | 5.90 | 87.35 | −10.47 | −0.07 |
| 26 | 66.37 | 36.47 | 68.46 | 23.42 | 13.79 | 0.60 | 28.43 | 492.98 | 7.40 | 86.72 | −11.34 | −1.30 |
| 27 | 66.41 | 36.36 | 68.51 | 23.27 | 13.42 | 0.60 | 28.21 | 492.85 | 7.47 | 86.74 | −11.34 | −1.39 |
| 28 | 66.26 | 36.14 | 68.38 | 23.28 | 13.13 | 0.59 | 28.21 | 492.75 | 7.57 | 86.68 | −11.40 | −1.47 |
| 29 | 65.88 | 35.72 | 68.04 | 23.46 | 12.61 | 0.59 | 28.36 | 492.40 | 7.93 | 86.54 | −11.61 | −1.76 |
| 30 | 63.78 | 33.47 | 66.13 | 23.19 | 10.10 | 0.57 | 28.16 | 491.66 | 9.16 | 85.64 | −12.55 | −2.53 |
| 31 | 66.71 | 36.86 | 68.69 | 21.69 | 14.22 | 0.60 | 26.98 | 494.19 | 6.59 | 86.78 | −11.03 | −0.52 |
| 32 | 64.98 | 34.69 | 67.17 | 22.71 | 11.38 | 0.58 | 27.94 | 492.49 | 8.09 | 86.11 | −11.89 | −1.72 |

It will be readily appreciated by one of ordinary skill in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A blue-green colored glass composition, comprising:

a base portion comprising:

| | |
   |---|---|
   | $SiO_2$ | 65 to 75 weight percent, |
   | $Na_2O$ | 10 to 20 weight percent, |
   | CaO | 5 to 15 weight percent, |
   | MgO | 0 to 5 weight percent, |
   | $Al_2O_3$ | 0 to 5 weight percent, |
   | $K_2O$ | 0 to 5 weight percent, and | major colorants comprising:

| | |
   |---|---|
   | $Fe_2O_3$ (total iron) | 0.7 to 0.9 weight percent, |
   | FeO | 0.2 to 0.3 weight percent, and |
   | CoO | 1 to 5 ppm, and |
   | $TiO_2$ | 0.1 to 2.0 weight percent, | wherein the glass is characterized by a dominant wavelength in the range of 490 nm to 495 nm, an excitation purity in the range of 7.5% to 10% and an ISOUV value greater than 30 percent at a thickness of 0.129 inch.

2. The glass composition of claim 1, wherein the glass is essentially free of Se.

3. The glass composition of claim 1, wherein the total iron is in the range of 0.7 weight percent to 0.85 weight percent.

4. The glass composition of claim 1, wherein the total iron is in the range of 0.73 weight percent to 0.81 weight percent.

5. The glass composition of claim 1, wherein the FeO is in the range of 0.21 wt. % to 0.3 wt. %.

6. The glass composition of claim 1, wherein the FeO is in the range of 0.23 wt. % to 0.28 wt. %.

7. The glass composition of claim 1, wherein the dominant wavelength is in the range of 490 nm to 493 nm.

8. The glass composition of claim 1, further comprising Se less than or equal to 2 ppm.

9. The glass composition of claim 8, wherein Se less than or equal to 1 ppm.

10. The glass of composition claim 1, further comprising less than 200 ppm $Cr_2O_3$.

11. The glass composition of claim 1, further comprising $Cr_2O_3$ in the range of 20 ppm to 100 ppm.

12. The glass composition of claim 1, further comprising $Cr_2O_3$ in the range of 20 ppm to 50 ppm.

13. The glass composition of claim 1, wherein $TiO_2$ is in the range of 0.1 weight percent to 1.5 weight percent.

14. The glass composition of claim 13, wherein $TiO_2$ is in the range of 0.2 weight percent to 1 weight percent.

15. The glass composition of claim 1, further comprising $SO_3$ less than or equal to 0.18 weight percent.

16. The glass composition of claim 1, wherein the glass has a visible light transmittance in the range of 64 percent to 69 percent at a thickness of 0.223 inch.

17. The glass composition of claim 1, wherein the glass has a visible light transmittance in the range of 64 percent to 68 percent at a thickness of 0.223 inch.

18. The glass composition of claim 1, wherein the glass has a TSET in the range of 30 percent to 40 percent at a thickness of 0.223 inch.

19. The glass composition of claim 1, wherein the glass has a TSET in the range of 33 percent to 37 percent at a thickness of 0.223 inch.

20. The glass composition of claim 1, wherein the glass has a shading coefficient in the range of 0.5 to 0.7 at a thickness of 0.223 inch.

21. The glass composition of claim 1, wherein the glass has a shading coefficient in the range of 0.57 to 0.6 at a thickness of 0.223 inch.

22. The glass composition of claim 1, wherein the glass has an ISOUV value in the range of 18 percent to 25 percent at a thickness of 0.223 inch.

23. The glass composition of claim 1, wherein the glass has an ISOUV value in the range of 19 percent to 21 percent at a thickness of 0.223 inch.

24. The glass composition of claim 1, wherein the glass has a redox ratio in the range of 0.2 to 0.4.

25. The glass composition of claim 1, wherein the glass has a redox ratio in the range of 0.29 to 0.37.

26. The glass composition of claim 14, wherein the glass has a first side and a second side, and the second side has tin or oxides of tin embedded therein.

27. A float glass made from the composition of claim 14.

28. A blue-green colored glass composition, comprising:

| a base portion comprising: | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, and |
| $K_2O$ | 0 to 5 weight percent, and |
| a colorants consisting essentially of: | |
| $Fe_2O_3$ (total iron) | 0.7 to 0.9 weight percent, |
| FeO | 0.2 to 0.3 weight percent, |
| CoO | 0 to 5 ppm, and |
| $TiO_2$ | 0 to 2.0 weight percent, | wherein the glass is characterized by a dominant wavelength in the range of 490 nm to 495 nm, an excitation purity in the range of 3% to 11%, and an ISOUV value greater than 25 percent at a thickness of 0.129 inch.

* * * * *